(12) United States Patent
Zhang et al.

(10) Patent No.: US 12,145,426 B2
(45) Date of Patent: Nov. 19, 2024

(54) ELECTRIC VALVE AND THERMAL MANAGEMENT SYSTEM

(71) Applicant: HANGZHOU SANHUA RESEARCH INSTITUTE CO., LTD., Zhejiang (CN)

(72) Inventors: Rongrong Zhang, Zhejiang (CN); Yiyuan Pan, Zhejiang (CN); Ke Yuan, Zhejiang (CN); Tuping Chen, Zhejiang (CN)

(73) Assignee: HANGZHOU SANHUA RESEARCH INSTITUTE CO., LTD., Zhejiang (CN)

( * ) Notice: Subject to any disclaimer, the term of this patent is extended or adjusted under 35 U.S.C. 154(b) by 120 days.

(21) Appl. No.: 17/911,169

(22) PCT Filed: Mar. 12, 2021

(86) PCT No.: PCT/CN2021/080344
§ 371 (c)(1),
(2) Date: Sep. 13, 2022

(87) PCT Pub. No.: WO2021/180191
PCT Pub. Date: Sep. 16, 2021

(65) Prior Publication Data
US 2023/0147150 A1    May 11, 2023

(30) Foreign Application Priority Data
Mar. 13, 2020 (CN) .......................... 202010175679.3

(51) Int. Cl.
*B60H 1/32* (2006.01)

(52) U.S. Cl.
CPC ... *B60H 1/3205* (2013.01); *B60H 2001/3254* (2013.01); *B60H 2001/3264* (2013.01); *B60H 2001/3285* (2013.01)

(58) Field of Classification Search
CPC ............. B60H 1/3205; B60H 1/00485; B60H 2001/3254; B60H 2001/3264;
(Continued)

(56) References Cited

U.S. PATENT DOCUMENTS

| 4,760,865 A | 8/1988 | Rilett |
| 5,070,706 A * | 12/1991 | Waters ................ G01L 19/0092 374/E13.006 |

(Continued)

FOREIGN PATENT DOCUMENTS

| CN | 102708851 A | 10/2012 |
| CN | 207049366 U | 2/2018 |

(Continued)

OTHER PUBLICATIONS

International Search Report dated Apr. 15, 2021 for PCT Appl. No. PCT/CN2021/080344.
(Continued)

*Primary Examiner* — Marc E Norman
(74) *Attorney, Agent, or Firm* — Ohlandt, Greeley and Perle, L.L.P.

(57) ABSTRACT

An electric valve and a thermal management system. The electric valve comprises a pressure sensing unit. The pressure sensing unit is connected to a valve seat, and the pressure sensing unit can sense the pressure characteristics of a working medium in a detection flow channel) and form a piezoelectric signal. An electric control portion comprises an electric control board. The piezoelectric signal forms, by means of a conditioning circuit, an electrical signal corresponding to a pressure. The electrical signal is used as a part for generating a signal for controlling a driving portion.

14 Claims, 5 Drawing Sheets

(58) Field of Classification Search
CPC .. B60H 2001/3285; F25B 41/31; F25B 41/33; F25B 41/34; F25B 41/345
See application file for complete search history.

(56) References Cited

U.S. PATENT DOCUMENTS

| | | | |
|---|---|---|---|
| 8,225,814 | B2 | 7/2012 | Igarashi |
| 2004/0206186 | A1 | 10/2004 | Clark et al. |
| 2011/0005250 | A1 | 1/2011 | Perz |
| 2021/0086588 | A1 | 3/2021 | Shinji et al. |
| 2022/0146164 | A1* | 5/2022 | Long .................. F25B 41/31 |

FOREIGN PATENT DOCUMENTS

| | | |
|---|---|---|
| CN | 108869830 A | 11/2018 |
| CN | 209495003 U | 10/2019 |
| CN | 209909196 U | 1/2020 |
| EP | 3623673 A1 | 3/2020 |
| JP | 63-500884 A | 3/1988 |
| JP | H09243492 A | 9/1997 |
| JP | 2001-170393 A | 6/2001 |
| JP | 2002-099330 A | 4/2002 |
| JP | 2019211180 A | 12/2019 |
| KR | 20200006090 A | 1/2020 |
| WO | 2018-205746 A1 | 11/2018 |

OTHER PUBLICATIONS

Extended European Search Report dated Feb. 14, 2024 for European Appl. No. 21767719.4.
Korean Office Action (with English translation) dated Oct. 31, 2023 for Korean Appl. No. 10-2022-7034847.
Japanese Office Action dated Nov. 7, 2023 for Japanese Appl. No. 2022-554874.

* cited by examiner

ELECTRIC VALVE AND THERMAL MANAGEMENT SYSTEM

This disclosure is a national phase application of PCT international patent application PCT/CN2021/080344, filed on Mar. 12, 2021, which claims priority of Chinese Patent Application No. 202010175679.3, titled "ELECTRIC VALVE AND THERMAL MANAGEMENT SYSTEM", filed with the China National Intellectual Property Administration on Mar. 13, 2020, which is incorporated herein by reference in its entirety.

FIELD

The present disclosure relates to an electric valve of a vehicle thermal management system and a thermal management system including the electric valve.

BACKGROUND

In order to improve a flow control accuracy of a working medium, an electric valve is provided in a vehicle thermal management system to adjust a flow of the working medium of the system. The electric valve controls the flow of the working medium by controlling superheat, the calculation to the superheat needs to obtain a passed pressure signal, and how to provide an electric valve which can obtain pressure signal at a lower cost is a technical problem.

SUMMARY

An object according to the present disclosure is to provide an electric valve capable of obtaining pressure signals at a low cost.

To achieve the above object, the following technical solutions are provided in the present disclosure: an electric valve, including a valve core, a valve seat, an electric control part and a driving part, where a first flow passage and a second flow passage are formed in the valve seat, and the electric valve is formed with a valve port, where the valve port is located between the first flow passage and the second flow passage, where the valve core can move relative to the valve port and change the opening degree of the valve port, the electric control part can control the driving part, and the driving part drives the valve core to move, where the electric valve further includes a pressure sensing unit, the pressure sensing unit is connected with the valve seat, and the pressure sensing unit can sense a pressure characteristic of the working medium in a detection flow passage and form a piezoelectric signal, where the electric control part includes an electric control board, the piezoelectric signal forms an electrical signal corresponding to the pressure characteristic by a conditioning circuit, and the electrical signal is used as a part of a signal for controlling the driving part.

A thermal management system, including an air conditioning system, where the air conditioning system includes an electric valve described above.

According to this technical solution, the piezoelectric signal is obtained through the pressure sensing unit, the electrical signal corresponding to the pressure signal is acquired by the piezoelectric signal through the conditioning circuit, and the electrical signal is used as a part of the signal for controlling the driving part, there is no need to separately provide a protective cover and a packaging structure of the pressure sensing unit, and the electric valve is used to protect the pressure sensing unit, which is beneficial to reduce the cost.

DETAILED DESCRIPTION OF THE EMBODIMENTS

The present disclosure is further illustrated hereinafter in conjunction with drawings and specific embodiments.

The thermal management system is mainly used in vehicles or household equipment, and the following is an explanation of the thermal management system for vehicles. The vehicle thermal management system at least includes an air conditioning system, and of course, with the disclosure of batteries in vehicles, the vehicle thermal management system may also include a battery cooling system. When the thermal management system works, the air conditioning system includes a refrigerant, which flows circularly, the battery cooling system includes a working medium that flows circularly, where the working medium can be water, oil, a mixture containing water or oil, a refrigerant, and the like.

Figure 10:
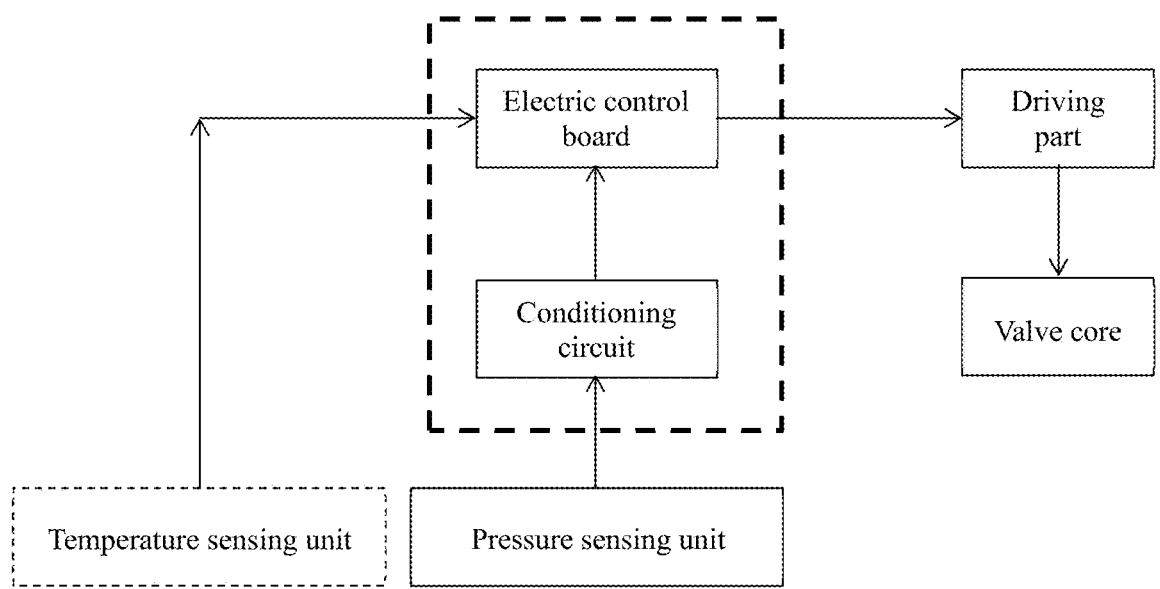
FIG. 10 is a block diagram of an embodiment of the electric valve.

FIG. 10 is a block diagram of an embodiment of the electric valve, where the electric valve includes a valve core, a valve seat, an electric control part and a driving part. A first flow passage and a second flow passage are formed on the valve seat, and the electric valve is provided with a valve port, which is located between the first flow passage and the second flow passage. The valve core can move relative to the valve port and change the opening degree of the valve port, the electric control part can control the driving part, and the driving part drives the valve core to move. In addition, the electric valve further includes a pressure sensing unit, the pressure sensing unit is connected with the valve seat, and the pressure sensing unit can sense a pressure characteristic of the working medium in the detection flow passage and form a piezoelectric signal, where the electric control part includes an electric control board, the piezoelectric signal forms an electrical signal corresponding to the pressure characteristic by means of a conditioning circuit, and the electrical signal is used as a part of a signal for controlling the driving part. According to this technical solution, the piezoelectric signal is obtained by the pressure sensing unit, the electrical signal corresponding to the pressure signal is acquired by the piezoelectric signal by the conditioning circuit, and the electrical signal is used as a part of the signal for controlling the driving part, and there is no need to separately provide a protective cover and packaging structure to the pressure sensing unit, and the electric valve is used to protect the pressure sensing unit, which is beneficial to reduce the cost.

Figure 1:
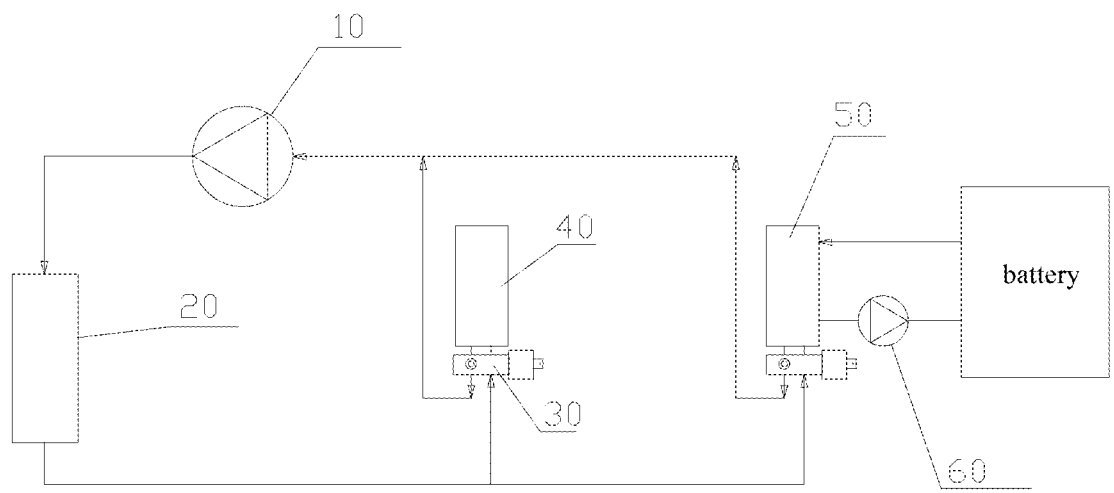
FIG. 1 is a schematic block diagram of an embodiment of a thermal management system.
Figure 2:
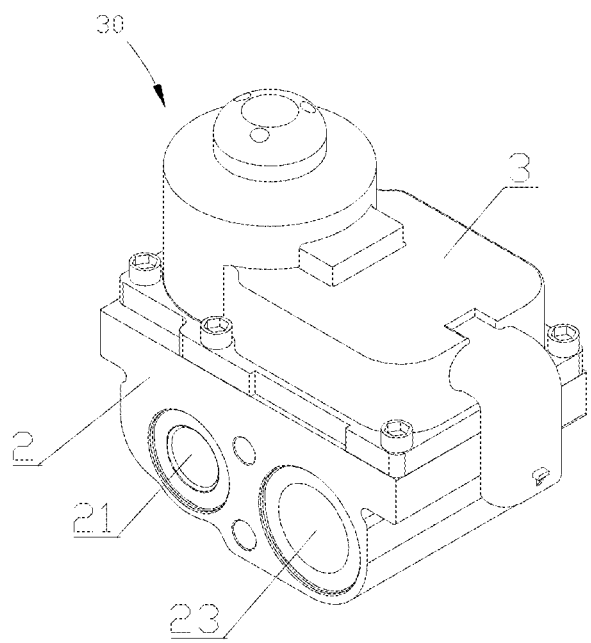
FIG. 2 is a structural perspective view of an electric valve from one direction.
Figure 3:
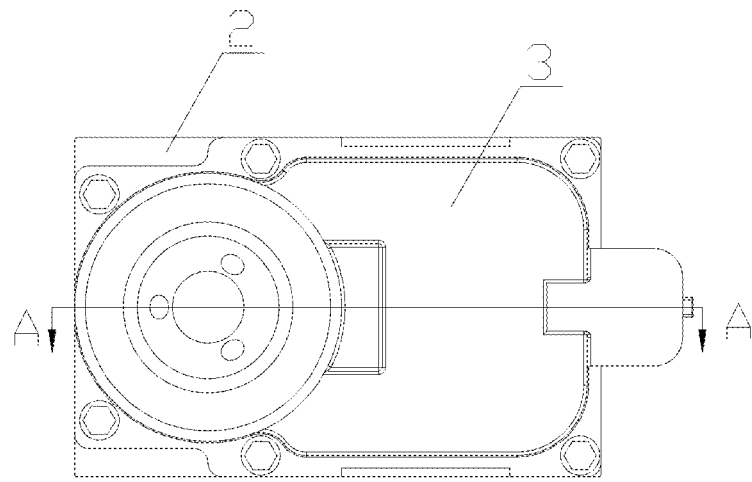
FIG. 3 is a schematic top view of the electric valve of FIG. 2.
Figure 4:
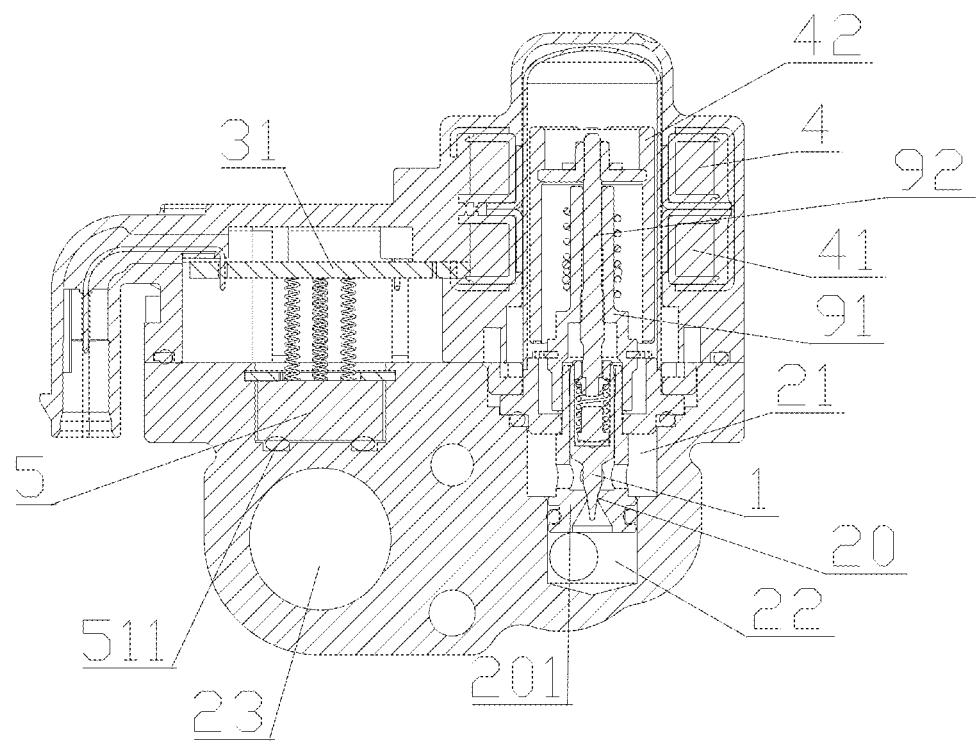
FIG. 4 is a schematic cross-sectional view of the electric valve of FIG. 3 taken along line A-A.
Figure 5:
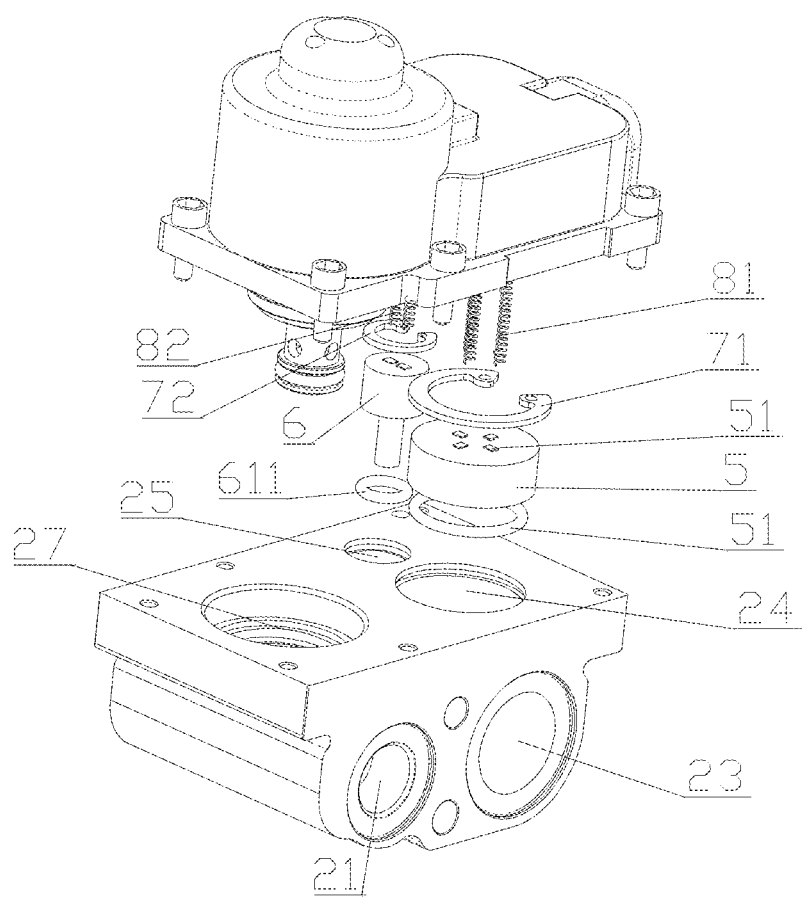
FIG. 5 is a partial structural exploded schematic diagram of the electric valve of FIG. 1.
Figure 6:
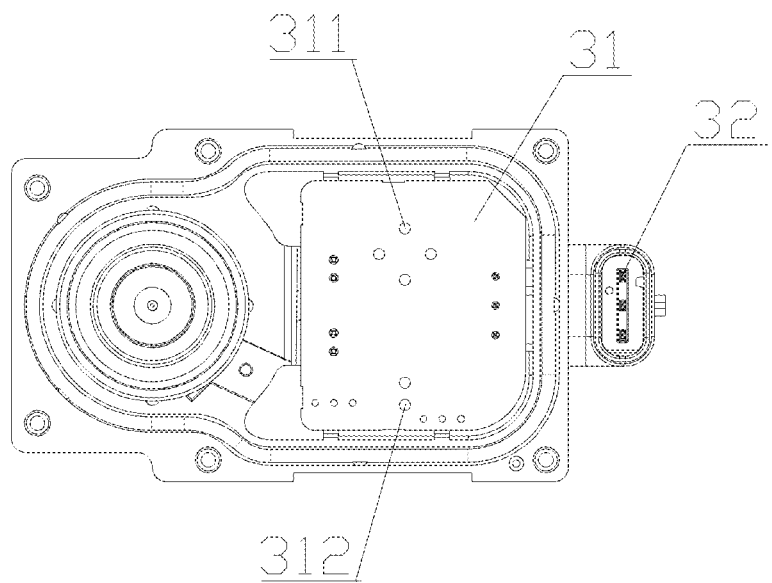
FIG. 6 is a schematic bottom view of an electric control part in FIG. 5.
Figure 7:
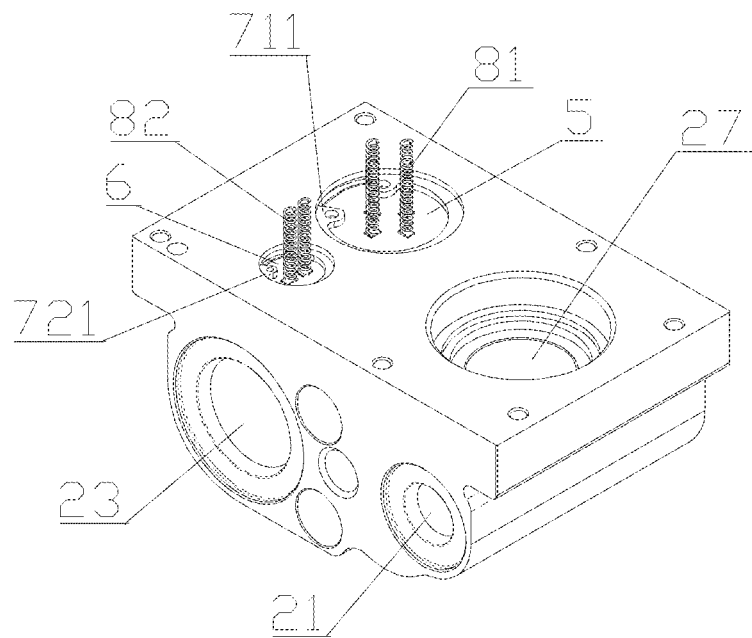
FIG. 7 is a schematic view of a combined three-dimensional structure of a valve seat, a temperature sensing unit, and a pressure sensing unit.
Figure 8:
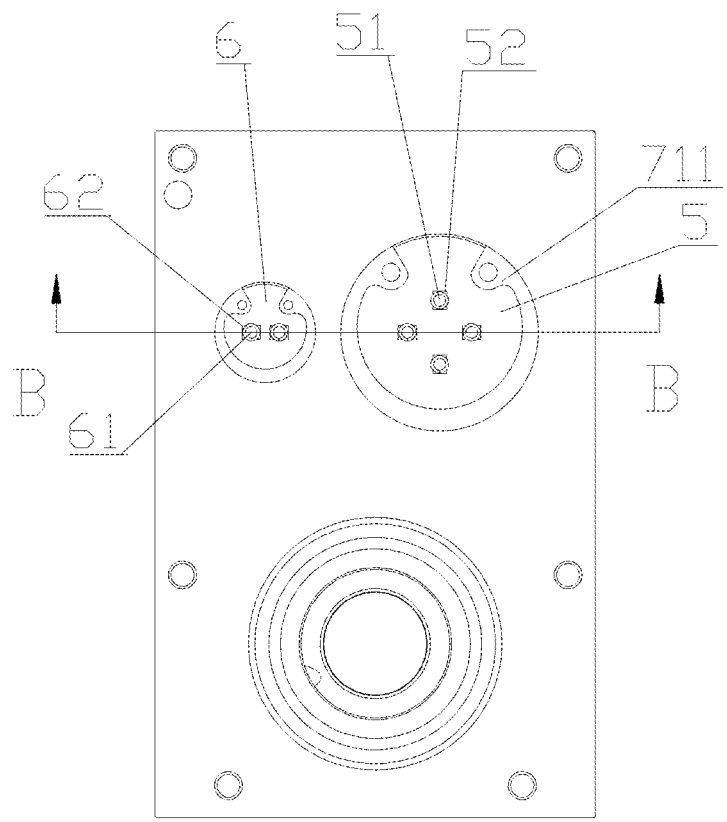
FIG. 8 is a schematic top view of the three-dimensional structure of FIG. 7.
Figure 9:
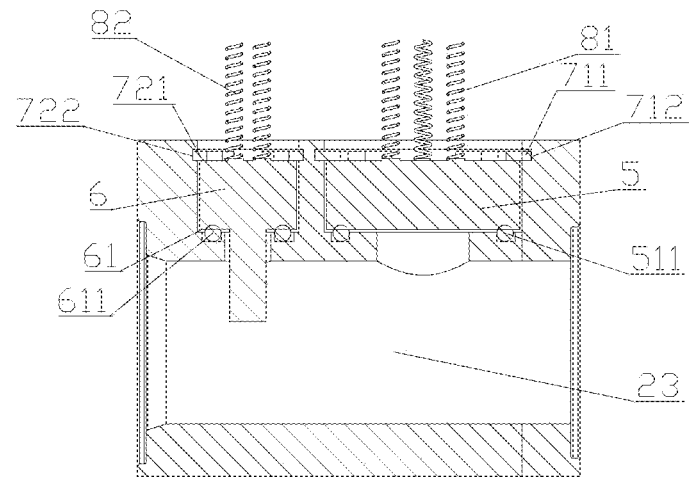
FIG. 9 is a schematic cross-sectional view of the electric valve of FIG. 7 taken along line B-B.

FIG. 1 is a schematic diagram of an embodiment of the thermal management system, in this embodiment, the thermal management system includes an air conditioning system and a battery cooling system, and the air conditioning system includes a compressor 10, a condenser 20, an electric valve 30 and an evaporator 40. When the air conditioning system works, the refrigerant is compressed into a high-temperature and high-pressure refrigerant by the compressor 10, and the high-temperature and high-pressure refrigerant is cooled by the condenser 20 and becomes a normal-temperature and high-pressure refrigerant, and the normal-temperature and high-pressure refrigerant enters the evaporator 40 through the electric valve 30. Since a pressure of the normal-temperature and high-pressure refrigerant decreases after passing through the electric valve 30, the refrigerant can be vaporized and become a low-temperature refrigerant, the low-temperature refrigerant absorbs a large amount of heat in the evaporator 40 and returns to the compressor 10. The battery cooling system includes a thermal management assembly 50 and a pump 60, the refrigerant in the air conditioning system exchanges heat with the working medium of the battery cooling system in the thermal management assembly 50, and the pump 60 provides power for the working medium of the battery cooling system to circulate.

Referring to FIG. 2 to FIG. 11, the electric valve 30 includes a valve core 1, a valve seat 2, an electric control part 3 and a driving part 4, and a first flow passage 21 and a second flow passage 22 are formed in the valve seat 2, and the electric valve 30 has a valve port 20. In this embodiment, the electric valve further includes a valve core seat 201, and the valve port 20 is formed in the valve core seat 201. Of course, in other embodiments, the valve port 20 can also be formed in the valve seat 2; where the valve port 20 is located between the first flow passage 21 and the second flow passage 22, where the electric control part 3 can control the driving part 4, which drives the valve core 1 to move, and the valve core 1 can move relative to the valve port 20 and change the opening degree of the valve port 20. The electric control part 3 includes an electric control board 31. In case that it is the control signal that an upper computer sends, the electric control board 31 is integrated with a conversion unit, which can convert the control signal into a driving signal and then enable the driving part 4 to drive the valve core 1 to move. In case that it is the system signal that the upper computer sends, the electric control board 31 is integrated with a micro-processing unit and a conversion unit, the micro-processing unit generates a control signal according to the system signal, and the conversion unit converts the control signal into a driving signal, and enables the driving unit 4 drive the valve core 1 to move.

In this embodiment, the electric control part 3 is provided with an input terminal 32, the input terminal 32 supplies power to the electric control board 31 and receives the signal sent by the upper computer. In this embodiment, the driving part 4 includes a coil assembly 41 and a rotor assembly 42, and the coil assembly 41 is electrically connected to the electric control board 31, the electric control board 31 sends a driving signal to the coil assembly 41, the coil assembly 41 generates an excitation magnetic field, and the rotor assembly 42 rotates under the action of the excitation magnetic field, the electric valve 30 further includes a transmission device, and the transmission device includes a nut 91 and a screw 92, the nut 91 is fixed, the screw 92 is connected with the rotor assembly 42 and the valve core 1, and the transmission device converts the rotation of the rotor assembly into an axial movement of the valve core 1. Of course, the above driving part and transmission device are not limited to the implementation of this embodiment, and other structures may be used to achieve the same effect.

In this embodiment, the electric valve 30 further includes a pressure sensing unit 5 and a temperature sensing unit 6, which are provided separately. Both the pressure sensing unit 5 and the temperature sensing unit 6 are in mechanical connected with the valve seat 2. The pressure sensing unit 5 can sense a pressure characteristic of the working medium in a detection flow passage 23 and form a piezoelectric signal, and the piezoelectric signal forms an electrical signal corresponding to the pressure by a conditioning circuit, and the electrical signal is used as a part of a signal for controlling the driving part, the above conditioning circuit is integrated in the electronic control board 31. The temperature sensing unit 6 extends into the detection flow passage 23, and the temperature sensing unit 6 is able to sense the temperature characteristics of the working medium in the detection flow passage as a part of the signal for controlling the driving part.

In this embodiment, the temperature sensing unit 6 and the pressure sensing unit 5 are formed separately, so that one of them can be replaced according to the requirements of the system, the arrangement of which is more flexible, and the flexibility of selection and combination of sensing units can be increased, which is beneficial to further lowering the product cost. In this embodiment, the detection flow passage 23 is located in the valve seat 2, and an extension direction of the detection flow passage 23 is the same with an extension direction of the first flow passage 21 and the second flow passage 22. Of course, the detection flow passage 23 can also be located in the heat exchanger or other components in the system.

The valve seat 2 has a first mounting cavity 24 in which the pressure sensing unit 5 is located, and the valve device 30 further includes a first position-limiting part 71 and a first connecting piece 81, where the pressure sensing unit 5 is position-limited with the valve seat 2 by the first position-limiting part 71, and the electric control board 31 and the pressure sensing unit 5 are electrically connected by the first connecting piece 81. In this embodiment, the pressure sensing unit 5 is a ceramic capacitive pressure sensor, but of course it can also be other pressure sensing units; the use of ceramic capacitive pressure sensors can effectively reduce costs. The first position-limiting part 71 includes a first clamping spring 711 and a first clamping groove 712 that is located in the valve seat 2, and the first clamping spring 711 can be clamped in the first clamping groove 712, where the first clamping spring 711 blocks an upper side of the pressure sensing unit 5, and a first sealing ring 511 is provided between a lower side of the pressure sensing unit 5 and the valve seat 2. Of course, the first position-limiting part is not limited to the first clamping spring and the first clamping groove, and may also be in the form of a threaded connection to limit the temperature sensing unit 5 and the valve seat 2.

In this embodiment, the first connecting piece 81 is a spring, and the electric control board 31 is fixed to the first connecting piece 81, where the pressure sensing unit 5 is provided with a first tin plate 51 and a first accommodating part 52, and the first tin plate 51 is located at a bottom of the first accommodating part 52, one end of the first connecting piece 81 is located in the first accommodating part 52 and is abutted with the first tin plate 51. The first connecting piece 81 is elastically deformed after assembly, so that the first connecting piece 81 is abutted with the first tin plate 51 to ensure that the first connecting piece 81 is electrically connected to the pressure sensing unit 5. An embodiment of fixing the electric control board 31 and the first connecting piece 81 by welding can be in that: the electric control board 31 forms the first insertion hole 311, and one end of the first connecting piece 81 is inserted into the first insertion hole 311 and fixed by welding. In another embodiment, the electric control board 31 also has a tin plate, and the first connecting piece 81 is abutted with the tin plate and is fixed by welding. Of course, in other embodiments, one of the pressure sensing unit and the electric control board is fixedly connected with the first connecting piece, and the other of the pressure sensing unit and the electric control board is abutted with the first connecting piece, which facilitates the positioning and limiting of the first connecting piece.

The valve seat 2 is further provided with a second mounting cavity 25, and the temperature sensing unit 6 is a thermistor and is located in the second mounting cavity 25. The valve device further includes a second position-limiting part 72 and a second connecting piece 82, where the temperature sensing unit 6 is position limited to the valve seat 2 by the second position-limiting part 72, and the electric control board 31 and the temperature sensing unit 6 are electrically connected by the second connecting piece 82.

In this embodiment, the second position-limiting part 72 includes a second clamping spring 721 and a second clamping groove 722 that is located in the valve seat 2, where the second clamping spring 721 is located in an upper side of the temperature sensing unit 6, and a stepped surface 61 of the temperature sensing unit 6 is abutted with the valve seat 2, and a second sealing ring 611 is arranged between the stepped surface 61 and the valve seat 2. The second connecting piece 82 is a spring, the electric control board 31 is fixed to the second connecting piece 82 by welding, and the temperature sensing unit 6 has a second tin plate 62 and a second accommodating part 63, the second tin plate 62 is located at a bottom of the second accommodating part 63, one end of the second connecting piece 82 is located in the second accommodating part 63 and is abutted with the second tin plate 62, where the second connecting piece 82 is elastically deformed after assembly, so that the second connecting piece 82 is abutted with the first tin plate 62 to ensure that the second connecting piece 82 is electrically connected to the temperature sensing unit 6; the connection manner of the second connecting piece 82 with the electric control board 31 and the temperature sensing unit 6 is not limited to the connection manner in this embodiment. Of course, the second position-limiting part is not limited to the second clamping spring and the second clamping groove, and may also be in the form of a threaded connection to limit the temperature sensing unit and the valve seat. An embodiment of fixing the electric control board 31 with the second connecting piece 82 by welding can be in that: the electric control board 31 forms the second insertion hole 312, and one end of the second connecting piece 82 is inserted into the second insertion hole 312 and fixed by welding.

The valve seat 2 further includes a valve core mounting cavity 27, and the valve core 1 is located in the valve core mounting cavity 27, the openings of the first mounting cavity 24, the second mounting cavity 25 and the valve core mounting cavity 27 are arranged toward a same side of the valve seat 2, and a throttling can be obtained at the valve port 20 by the electric valve. One of the first flow passage 21 and the second flow passage 22 is configured as upstream, and the other of the first flow passage 21 and the second flow passage 22 is configured as downstream, and the detection flow passage 23 is located in a downstream passage or the detection flow passage 23 is in communication with a downstream passage through a thermal management system. In other embodiments, the valve seat can also be a transfer piece or located in a heat exchanger.

It should be noted that, the above embodiments are only intended to illustrate the present disclosure and not to limit the technical solutions described in the present disclosure. Although the present specification has been described in detail with reference to the embodiments described above, it should be understood by those skilled in the art that, various modifications and equivalents can be made to the technical solutions of the present disclosure without departing from the spirit and scope of the present disclosure, all of which should be contained within the scope of the claims of the present disclosure.

What is claimed is:

1. An electric valve, comprising a valve core, a valve seat, an electric control part and a driving part, wherein a first flow passage and a second flow passage are formed in the valve seat, and the electric valve is formed with a valve port, wherein the valve port is located between the first flow passage and the second flow passage, wherein the valve core is capable of moving relative to the valve port and changing the opening degree of the valve port, the electric control part is configured to control the driving part, and the driving part drives the valve core to move, wherein the electric valve further comprises a pressure sensing unit, the pressure sensing unit is connected with the valve seat, and the pressure sensing unit is capable of sensing a pressure characteristic of the working medium in a detection flow passage and form a piezoelectric signal, wherein the electric control part comprises an electric control board, the piezoelectric signal forms an electrical signal corresponding to the pressure characteristic by a conditioning circuit, and the electrical signal is used as a part of a signal for controlling the driving part, wherein the valve seat is provided with a first mounting cavity, the pressure sensing unit is located in the first mounting cavity, wherein the valve device further comprises a first position-limiting part and a first connecting piece, wherein the pressure sensing unit is position limited to the valve seat by the first position-limiting part, and the electric control board and the pressure sensing unit are electrically connected by the first connecting piece, wherein the first position-limiting part comprises a first clamping spring and a first clamping groove that is located in the valve seat, the first clamping spring is capable of being clamped in the first clamping groove, wherein the first clamping spring is blocked on an upper side of the pressure sensing unit, and a first sealing ring is arranged between a lower side of the pressure sensing unit and the valve seat; and/or, the pressure sensing unit is a ceramic capacitive pressure sensor.

2. The electric valve according to claim 1, wherein the conditioning circuit is integrated in the electric control board, wherein one of the pressure sensing unit and the electric control board is fixedly connected with the first connecting piece, and the other of the pressure sensing unit and the electric control board is abutted with the first connecting piece.

3. The electric valve according to claim 2, wherein the first connecting piece is a spring, and the electric control board is fixed to the first connecting piece by welding, wherein the pressure sensing unit has a first tin plate and a first accommodating part, and the first tin plate is located at a bottom of the first accommodating part, wherein one end of the first connecting piece is located in the first accommodating part and is abutted with the first tin plate, and the first connecting piece is elastically deformed.

4. The electric valve according to claim 3, wherein the electric valve further comprises a temperature sensing unit, and the temperature sensing unit extends into the detection flow passage, wherein the temperature sensing unit can sense the temperature characteristics of the working medium in the detection flow passage as a part of the signal for controlling the driving part, wherein the temperature sensing unit and the pressure sensing unit are connected with the electric control board, respectively.

5. The electric valve according to claim 2, wherein the electric valve further comprises a temperature sensing unit, and the temperature sensing unit extends into the detection flow passage, wherein the temperature sensing unit can sense the temperature characteristics of the working medium in the detection flow passage as a part of the signal for controlling the driving part, wherein the temperature sensing unit and the pressure sensing unit are connected with the electric control board, respectively.

6. The electric valve according to claim 1, wherein the electric valve further comprises a temperature sensing unit, and the temperature sensing unit extends into the detection flow passage, wherein the temperature sensing unit can sense the temperature characteristics of the working medium in the detection flow passage as a part of the signal for controlling the driving part, wherein the temperature sensing unit and the pressure sensing unit are connected with the electric control board, respectively.

7. The electric valve according to claim 6, wherein the valve seat is further provided with a second mounting cavity, wherein the temperature sensing unit is a thermistor and is located in the second mounting cavity, wherein the valve device further comprises a second position-limiting part and a second connecting piece, wherein the temperature sensing unit is position limited to the valve seat by the second position-limiting part, and the electric control board and the temperature sensing unit are electrically connected by the second connecting piece.

8. The electric valve according to claim 7, wherein the second position-limiting part comprises a second clamping spring and a second clamping groove that is located in the valve seat, wherein the second clamping spring is capable of being clamped in the second clamping groove, the second clamping spring is blocked on an upper side of the temperature sensing unit, wherein a downward stepped surface of the temperature sensing unit is abutted with the valve seat, wherein a second sealing ring is provided between the stepped surface and the valve seat.

9. The electric valve according to claim 8, wherein the second connecting piece is a spring, the electric control board is fixed to the second connecting piece by welding, and the temperature sensing unit has a second tin plate and a second accommodating part, wherein the second tin plate is located at a bottom of the second accommodating part, wherein one end of the second connecting piece is located in the second accommodating part and is abutted with the second tin plate, and the second connecting piece is elastically deformed.

10. The electric valve according to claim 9, wherein the valve seat further comprises a valve core mounting cavity, and the valve core is located in the valve core mounting cavity, wherein the openings of the first mounting cavity, the second mounting cavity and the valve core mounting cavity are arranged toward a same side of the valve seat, wherein the detection flow passage is formed in the valve seat, and a throttling at the valve port is obtained by the electric valve, wherein one of the first flow passage and the second flow passage is configured as upstream, the other of the first flow passage and the second flow passage is configured as downstream, wherein the detection flow passage is located in a downstream passage or the detection flow passage is in communication with the downstream passage by a thermal management system.

11. The electric valve according to claim 8, wherein the valve seat further comprises a valve core mounting cavity, and the valve core is located in the valve core mounting cavity, wherein the openings of the first mounting cavity, the second mounting cavity and the valve core mounting cavity are arranged toward a same side of the valve seat, wherein the detection flow passage is formed in the valve seat, and a throttling at the valve port is obtained by the electric valve, wherein one of the first flow passage and the second flow passage is configured as upstream, the other of the first flow passage and the second flow passage is configured as downstream, wherein the detection flow passage is located in a downstream passage or the detection flow passage is in communication with the downstream passage by a thermal management system.

12. The electric valve according to claim 7, wherein the valve seat further comprises a valve core mounting cavity, and the valve core is located in the valve core mounting cavity, wherein openings of the first mounting cavity, the second mounting cavity and the valve core mounting cavity are arranged toward a same side of the valve seat, wherein the detection flow passage is formed in the valve seat, and a throttling at the valve port is obtained by the electric valve, wherein one of the first flow passage and the second flow passage is configured to be an upstream passage, the other of the first flow passage and the second flow passage is configured to be a downstream passage, wherein the detection flow passage is located in the downstream passage or the detection flow passage is in communication with the downstream passage by a thermal management system.

13. The electric valve according to claim 1, wherein the electric valve further comprises a temperature sensing unit, and the temperature sensing unit extends into the detection flow passage, wherein the temperature sensing unit can sense the temperature characteristics of the working medium in the detection flow passage as a part of the signal for controlling the driving part, wherein the temperature sensing unit and the pressure sensing unit are connected with the electric control board, respectively.

14. A thermal management system, comprising an air conditioning system, wherein the air conditioning system comprises the electric valve according to claim 1.

* * * * *